United States Patent [19]

Herzog et al.

[11] Patent Number: 4,509,871
[45] Date of Patent: Apr. 9, 1985

[54] PLAY-FREE ANTI-FRICTION BEARING CONSTRUCTION

[75] Inventors: Klaus Herzog, Oberkochen; Franz Szenger, Konigsbronn, both of Fed. Rep. of Germany

[73] Assignee: Carl-Zeiss-Stiftung, Heidenheim/Brenz, Oberkochen, Fed. Rep. of Germany

[21] Appl. No.: 551,173

[22] Filed: Nov. 14, 1983

[30] Foreign Application Priority Data

Nov. 30, 1982 [DE] Fed. Rep. of Germany ....... 3244258

[51] Int. Cl.³ ............................................. F16C 19/06
[52] U.S. Cl. .................................... 384/502; 384/513; 384/537
[58] Field of Search .......... 308/189 A, 189 R, 207 A, 308/207 R, 190, 208

[56] References Cited

U.S. PATENT DOCUMENTS

| | | | |
|---|---|---|---|
| 4,229,059 | 10/1980 | Dever | 308/189 R |
| 4,296,979 | 10/1981 | Hofmann et al. | 308/189 R |
| 4,452,654 | 6/1984 | KaDell | 308/189 A |
| 4,458,958 | 7/1984 | Kapaan et al. | 308/189 A |

Primary Examiner—Lenard A. Footland
Attorney, Agent, or Firm—Hopgood, Calimafde, Kalil, Blaustein & Judlowe

[57] ABSTRACT

The invention contemplates an anti-friction bearing wherein the inner raceway for a complement of rolling elements is ground directly in the shaft which is to have anti-friction support. The outer raceway is provided in the bore of a relatively thin-wall outer ring which is locally split, as by an axial slit. The outer ring is compliantly widened at the split, to permit introduction of the complement of rolling elements through the widened slit; the outer ring is then relaxed for circumferential engagement of all rolling elements, whereupon the outer ring is clamped tight against the shaft without play by means of a tensed circumferential wrap of spring-steel wires or bands. Thereafter, the wrapped bearing is bedded via jointing agents in the bore of a bearing housing. With such construction, the outer race in the outer ring adapts itself to the precision-ground inner or shaft raceway, via the rolling elements, and therefore the outer ring and its raceway may be manufactured to lesser tolerances, and yet the precision of the finished article will be primarily a function of the precision of the inner raceway.

11 Claims, 9 Drawing Figures

PLAY-FREE ANTI-FRICTION BEARING CONSTRUCTION

BACKGROUND OF THE INVENTION

Anti-friction bearings of the radial variety generally use ball or roller elements in prefabricated subassemblies which are installed in suitably prepared bearing seats. Very high requirements must be satisfied as to precision and shape of all structural parts which determine the bearing seat and as to care upon installation, if running precision within the $\mu$m range is to be obtained for a shaft mounted in such a bearing.

For running precision within the range of 0.6 $\mu$m to 1 $\mu$m, complete spindle units are available which contain a plurality of ball bearings which are adapted to each other. Such units are bulky and expensive.

Highly accurate anti-friction bearings for special applications are therefore frequently manufactured as special products for the intended use. In such bearings, the rolling elements generally roll on raceways which are developed directly in the parts to be supported. For this purpose, shaft and bushing surfaces involved in running engagement must be adapted to each other with utmost precision. This approach is relatively expensive and nevertheless does not in all cases assure the desired running precision.

Running precison within the region down to a few hundredths of one $\mu$m can, to be sure, be obtained with hydrostatic bearings or gas bearings. However, such bearings are unwieldy and also very expensive, due to the auxiliary pressure-fluid supply units which they require.

So-called "split-ring" or "fracture bearings" are known to provide high-load capacity in a ball bearing; they are characterized by an outer-race ring which has been fractured in order to permit reception of a maximum complement of bearing balls. In the manufacture of such a bearing, the outer ring is locally scored and then precision-ground; it is then mated to the inner-race ring, and a set of balls is selected, based on measured raceway clearance and desired ultimate bearing clearance. The outer ring is then fractured at the score, and the selected balls are introduced to complete the assembly through additional clearance afforded by transiently expanding the fractured ring. Clamping rings around the outer ring assure retention of an accurate match and continuity of the outer raceway surface at the fracture. Such bearings are not inherently free of play and must be clamped, in known manner.

BRIEF STATEMENT OF THE INVENTION

The object of the present invention is to provide a play-free radial-bearing construction (a) which is characterized by displacement precision in the range below 1 $\mu$m, (b) which does not require any pressure-fluid supply, and (c) which is of relatively low manufacturing cost.

This object is achieved in a radial-bearing construction having a clamped split outer-ring, and wherein:

(a) the inner ring of the bearing is formed directly by the shaft, having the inner raceway formed therein, (b) the diameter of the rolling elements is so selected that the slit or break of the outer ring has a finite width in the clamped condition of the bearing, and (c) outer ring is relatively thin and is bedded in an outer bearing part, with jointing means bonding the same to the bore of the outer bearing part.

With a bearing according to the invention, it is not necessary to adapt the raceways of the shaft and of the outer ring to each other. The raceway in the split outer ring can, rather, be manufactured with far less precision since, in the process of ring-clamping, the outer ring adapts itself with a high degree of accuracy, over the rolling elements and to the inner ring; such adaptation is facilitated by the thinness of the outer-ring wall and by a gap at the split of the ring. The outer ring with a finite gap is clamped by means of a circumferential wrap of spring wire or strap material, thus applying a circumferential distribution of uniform and purely radially directed clamping forces on the rolling elements of the bearing. In this way, complete freedom from play is obtained without having the clamp warp the bearing.

Surprisingly, the remaining circumferential gap in the raceway of the outer ring does not interfere with the precision of rotary displacement of the bearing, even if the raceway of the outer ring is beveled at the region of the split.

One suitable method of manufacturing the bearing is performed as follows:

First of all, one or more inner raceways for the rolling elements are ground with high precision into the shaft which is to be supported, preferably in a single chucking of the involved machine tool. Thereupon, one or more split thin outer rings are positioned around the shaft, to provide corresponding outer raceways. The outer rings are then compliantly stretched to widen a gap, and the rolling elements are suitably assembled to each pair of opposed raceways, through the involved widened gap. The diameter of the rolling elements is selected sufficiently large that, after the raceways have been filled, the outer ring engages all rolling elements upon compliant return to its rest position, and so that the gap cannot close completely, i.e., it remains a small but finite gap. Each of the outer rings is then wrapped with a wire or band, under constant tension. After fastening the wires or bands, the shaft and its thus-assembled bearings is installed in the bore of a bearing housing, the clamped outer rings being bedded in and bonded to the bore by jointing means, for example, metal bonding agents.

The inner races may advantageously be developed as V-grooves ground in a hardened shaft, and the rolling bodies may then roll directly on the flanks of such grooves. It is, however, also possible to insert wires into raceways developed on the shaft, and to have the rolling elements roll on these wires in the manner of a Franke bearing.

To manufacture high-precision spindle units of great rigidity, a plurality of raceways is advisedly formed in the shaft, and a separate split outer ring is associated with each raceway.

If the rolling elements roll on both flanks of V-grooves in the shaft and in the outer ring, the so-called "drilling-friction" effect is obtained, in the same way as in wire-race ball bearings. A particularly smooth-action bearing is obtained if the inner raceways are developed as double grooves for association with a single split outer ring having two spaced outer-race grooves, and if the axial distances between grooves in the shaft and between grooves in the outer ring are slightly different. In this way, the result is obtained that every rolling element engages only one flank of an inner-race groove and only one flank of an outer-race groove, so that only pure rolling friction is involved.

DETAILED DESCRIPTION

Various illustrative embodiments will be described in further detail, in conjunction with the accompanying drawings, in which.

Figure 1A:
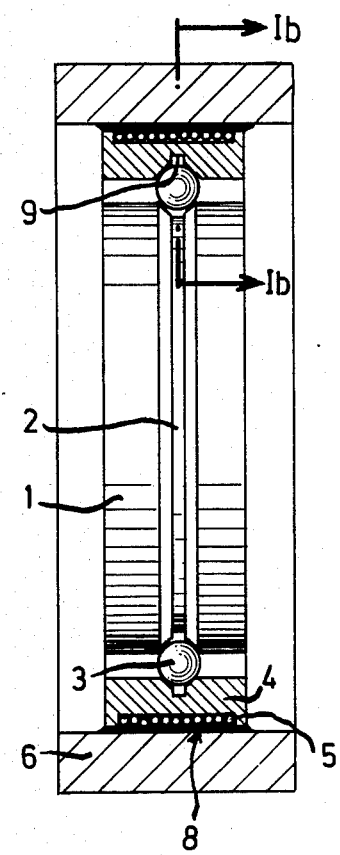
FIG. 1a is a longitudinal sectional view of a first embodiment of a split-outer ring bearing of the invention.
Figure 1B:
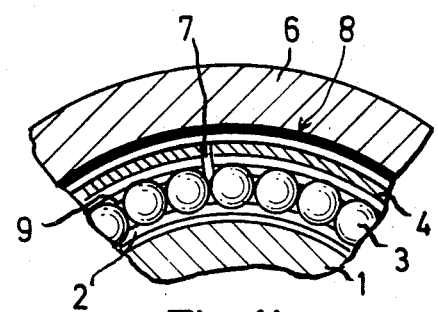
FIG. 1b is a fragmentary sectional view along the line 1b—1b of FIG. 1a and in the split region of the outer ring.

The bearing shown in FIGS. 1a and 1b consists of a shaft 1 which is mounted for rotation with respect to a housing 6. For this purpose, a raceway 2 has been ground with high precision into shaft 1, and balls 3 roll on said raceway.

A thin-walled outer ring 4, locally split or slitted at 7, is ground with an extending circumferential raceway 9, around the complement of balls 3. As compared with raceway 2, raceway 9 has been manufactured with less precision of running tolerance. Close tolerances need not be maintained for the diameter of the raceway 9 since slit 7 provides a gap which accommodates deviations in manufacture. Plural turns of a spring steel wire 5 are tension-wound over the circumference of ring 4. The ring 4 is bedded in and secured to the bore of housing 6 by means of ordinary jointing means 8, such as a metal-filled bonding material.

Figure 1C:
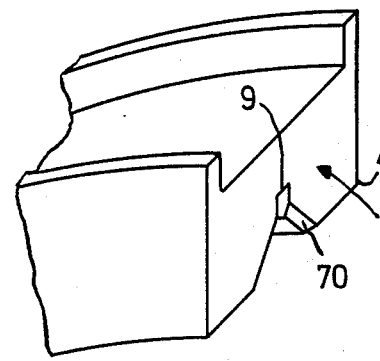
FIG. 1c is a fragmentary perspective view of the split region of the outer ring of the bearing of FIGS. 1 and 2.

For utmost quiet in operation of the bearing, a bevel 70 (FIG. 1c) is developed on the raceway 9 of the outer ring 4 in the region of slit 7.

Figure 2:
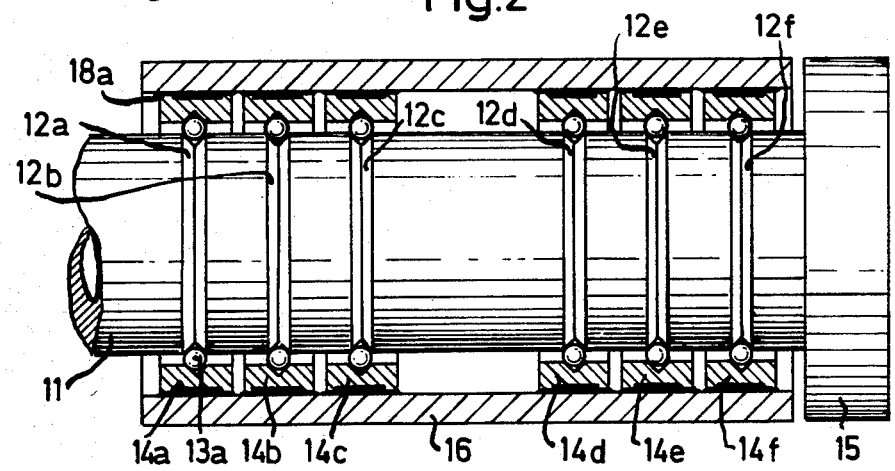
FIG. 2 is a longitudinal sectional view to show a spindle unit having a plurality of the bearings according to FIG. 1.

In the spindle unit of FIG. 2, a shaft 11 is supported by a plurality of the bearing units described above. The shaft 11 is shown with an end-closure plate 15, and is supported with respect to the bore of a housing 16 by two groups of three bearings each. For this purpose, six inner raceways 12a, b, ... f are ground into the shaft 11 in a single machine chucking, and a separate outer ring 14a, b ... f is assembled over each inner raceway.

A complement of balls 3 is provided for each pair of outer rings 14a, b ... f and raceways 12a, b ... f. Thus, each of the bearing components 12a-14a, 12b-14b ... 12f-14f has the same construction as that already described in FIG. 1.

The spindle-unit bearing of FIG. 2 has high rigidity and load-carrying capacity, and since defects in the guide paths 12a, b ... f counteract each other to a certain extent, the spindle rotates with excellent running precision.

Ball rotation in the bearings of FIGS. 1 and 2 is characterized by a "drilling" component, in addition to pure rolling friction, for the reason that all balls are engaged at opposed flanks of the same raceways, as is also the case for Franke-type bearings discussed below in connection with FIGS. 4 and 5. To provide bearings characterized by extreme ease of rotary action, and to avoid this "drilling" component of friction, the construction of FIG. 3 is recommended.

Figure 3:
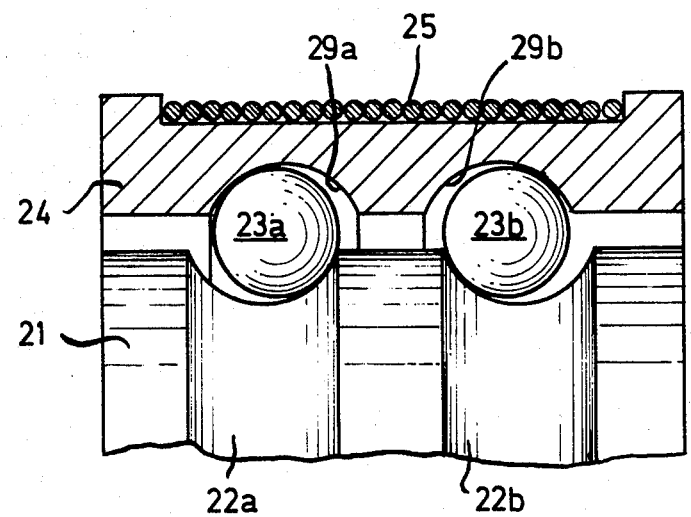
FIG. 3 is a fragmentary longitudinal section of a slightly modified second embodiment of the invention.

In FIG. 3, two adjacent grooved inner raceays 22a and 22b of arcuate section are ground in shaft 21. The outer ring 24 also has two raceways 29a–29b of arcuate section, but the axial distance between raceways 29a–29b differs from the axial distance between raceways 22a–22b, so that all balls in the respective rows 23a and 23b roll only against one flank of raceways 22a–29a and 22b–29b, respectively.

Each pair of inner raceways 22a–22b and outer raceways 29a–29b may be made in a single chucking operation and with identical diameters. The absolute value of the diameter of the raceways, however, does not require close tolerances.

Figure 4:
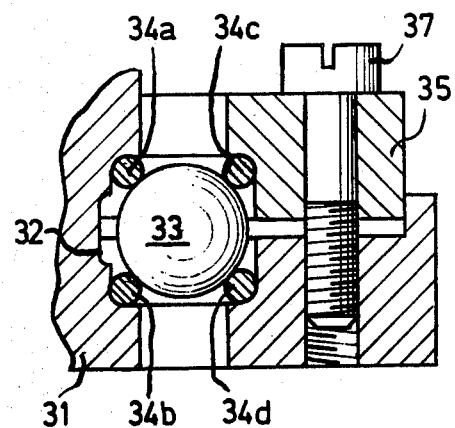
FIG. 4 is a fragmentary sectional view of a so-called Franke bearing of traditional construction.

FIG. 4 shows a traditional, so-called Franke wire-race ball bearing in which two wires 34a and 34b are inserted into a groove 32 in the inner ring 31, the balls 33 rolling on said wires. The outer raceway is formed by two additional wires 34c and 34d which lie in a groove in the radially divided outer ring. To clamp the bearing, bolts 37 are customarily used, to draw together the axially spaced two parts 35 and 36 of the outer ring.

Such wire-race ball bearings have rather large dimensions, primarily for accommodation of the clamping bolts which are distributed on their periphery.

Figure 5:
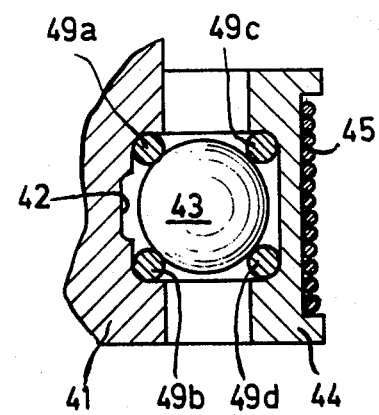
FIG. 5 is a fragmentary sectional view of a third embodiment of the invention, developed as a Franke bearing.

FIG. 5 illustrates the invention in application to a modified wire-race ball bearing. Again, two wires 49a and 49b are inserted into a groove 47 of the shaft 41, thereby defining the inner raceway, and balls 43 roll on said wires. A single groove in the outer ring 44 also contains two wires 49c and 49d, which define the outer raceway. As in FIG. 1, the outer ring 44 is thin-walled and split locally, being circumferentially clamped by means of plural tensed wraps of spring wire 45.

Due to the purely radially directed clamping force which is distributed continuously over the circumference, the bearing of FIG. 5 is characterized by very much greater running precision than the bearing of FIG. 4, which is clamped by bolts at discrete points. In addition, the bearing of FIG. 5 is of substantially smaller dimensions.

Figure 6:
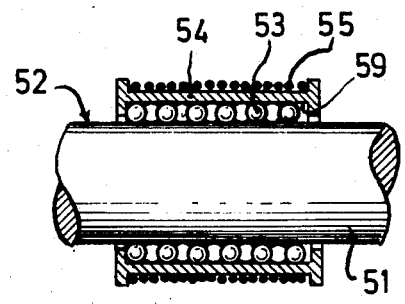
FIGS. 6 and 7 are similar views for fourth and fifth embodiments.

FIG. 6 illustrates application of the invention to a bearing in the form of a ball bushing. A shaft 51 is provided with a smoothly ground cylindrical outer surface 52 which serves as the race over and along which a plurality of rows of balls 53 roll alongside of each other. Around the balls, a thin-walled split outer ring 54 is characterized, between end flanges, by a cylindrical inner surface 59 which is also ground smooth.

The balls 53 in adjacent rows are arranged in closely packed relation, staggered by one ball radius from each other. Balls 53 will be understood to have been introduced through the axially extending slit (not shown) of the split outer ring 54 after the ring has been compliantly spread open. To clamp the split outer ring 54, a layer of spring steel wire 55 is again tension-wound in closely adjacent turns over ring 54.

Figure 7:
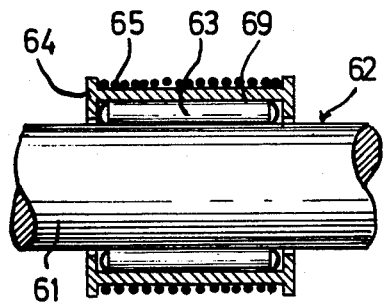

FIG. 7 shows application of the invention to a needle-bearing construction. The FIG. 7 shaft 61 and split outer ring 64 may be as described for the corresponding parts 51 and 54 of the ball bushing of FIG. 6, the difference being that a complement of elongate needles 63 rather than balls provides play-free rolling suspension of shaft 61 with respect to outer ring 64. Tensed wrap of steel wire 65 around the split outer ring completes the assembly.

It will be understood that in each of the embodiments of FIGS. 3, 5, 6 and 7, the split outer ring is ultimately mounted and bonded to the bore of a housing member, as described for housing 6 and 16 of FIGS. 1 and 2.

What is claimed is:

1. A radial anti-friction bearing having an outer ring (4; 14; 24; 44; 54; 64) which has a split (7) or break transverse to the running direction of anti-friction elements (3; 13; 23; 43; 53; 63) and having clamping rings or wires (5; 25; 45; 55; 65) placed over the outer ring, characterized by the fact that
    (a) the inner ring of the bearing is formed directly by a shaft (1; 11; 21; 41; 51; 61) having an inner raceway developed therein,
    (b) the diameter of the anti-friction elements is so selected that the slit (7) or break in the outer ring is characterized by a finite gap in the clamped condition of the bearing, and
    (c) the outer ring is thin-walled and is bedded by jointing means in the bore of an outer bearing part (6, 16).

2. An anti-friction bearing according to claim 1, characterized by the fact that the anti-friction elements (3; 13; 23) are balls which roll directly on the sides of grooves (2; 12; 22; 29) ground into the bearing.

3. An anti-friction bearing according to claim 1, characterized by the fact that the anti-friction elements (43) are balls which roll on wires (49) inserted in guideways formed in the shaft and in the outer ring.

4. An anti-friction bearing according to claim 1, characterized by the fact that a plurality of raceways (12a–f) are ground into the shaft (11) and a separate split outer ring (14a–f) is associated with each raceway.

5. An anti-friction bearing according to claim 1, characterized by the fact that the raceways are developed as double grooves (22, 29) with a common split outer ring (24) associated with them and that the distances apart of the grooves (22) in the shaft (21) and of the grooves (29) in the outer ring (24) are different.

6. An anti-friction bearing according to claim 1, characterized by the fact that the raceways (52, 59) are smoothly cylindrical and in each case several rows of balls (53) roll in contact with and alongside one another on these raceways.

7. An anti-friction bearing according to claim 1, characterized by the fact that the raceways (62, 69) are smoothly cylindrical and the anti-friction elements are rollers (63) or needles.

8. An anti-friction bearing according to claim 1, characterized by the fact that the raceway (9) of the outer ring (4) is beveled in the region of the split (7) or break.

9. A play-free radial anti-friction bearing comprising an inner element having a precision-ground inner raceway, a split outer ring having an outer raceway formed therein, a plurality of anti-friction elements riding said raceways, the diameter of said anti-friction elements being such that a circumferential gap is established at the split of said outer ring when all anti-friction elements are in full radially supported contact with both said raceways, and a circumferentially tensed wrap of wire around said outer ring maintaining all anti-friction elements in preloaded radial engagement with both raceways.

10. The bearing of claim 9, in which said outer ring is relatively thin-walled and is characterized by radial compliance, and a housing having a bore in which said wrapped outer ring is bedded and bonded.

11. The bearing of claim 9, in which said inner element is a shaft.

* * * * *